(12) United States Patent
Wildey

(10) Patent No.: US 6,463,080 B1
(45) Date of Patent: Oct. 8, 2002

(54) METHOD AND APPARATUS FOR CONTROLLING TIME DIVERSITY IN TELEPHONY

(75) Inventor: Christopher George Wildey, Hertfordshire (GB)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/081,235

(22) Filed: May 19, 1998

(30) Foreign Application Priority Data

Jun. 6, 1997 (GB) .............................................. 9711825

(51) Int. Cl.[7] .................................................. H04J 3/06
(52) U.S. Cl. ...................................... 370/508; 455/101
(58) Field of Search ................................ 370/332, 333, 370/329, 334, 508, 519; 375/267, 299, 346, 347, 348, 349; 455/63, 66, 67.1, 67.3, 161.3, 161.2, 161.1, 295, 296, 101

(56) References Cited

U.S. PATENT DOCUMENTS 5,426,668 A   6/1995   Lechleider ................... 375/267

5,557,639 A   9/1996   Heikkila et al. ............ 375/224

FOREIGN PATENT DOCUMENTS

| EP | 0 588 741 A1 | 3/1994 |
| JP | 08-195709 | * 7/1996 |
| WO | WO 95/12927 | 5/1995 |

OTHER PUBLICATIONS

PCT International Search Report.
Japanese Patent Document No.: JP 080195709.
United Kingdom Search Report.

* cited by examiner

*Primary Examiner*—Wellington Chin
*Assistant Examiner*—Brenda Pham
(74) *Attorney, Agent, or Firm*—Perman & Green, LLP

(57) ABSTRACT

A system of radio telephony in which time diversity is utilised to improve the quality of voice communication. Variable time diversity is introduced into the transmitted signal such that relatively longer time delays are present under poorer communication conditions. This variable time diversity can be produced by variable depth interleaving, or by use of at least two TDMA slots operating with sufficient time offset to de-correlate errors generated in the two channels.

18 Claims, 5 Drawing Sheets

METHOD AND APPARATUS FOR CONTROLLING TIME DIVERSITY IN TELEPHONY

FIELD OF THE INVENTION

Figure 1A:
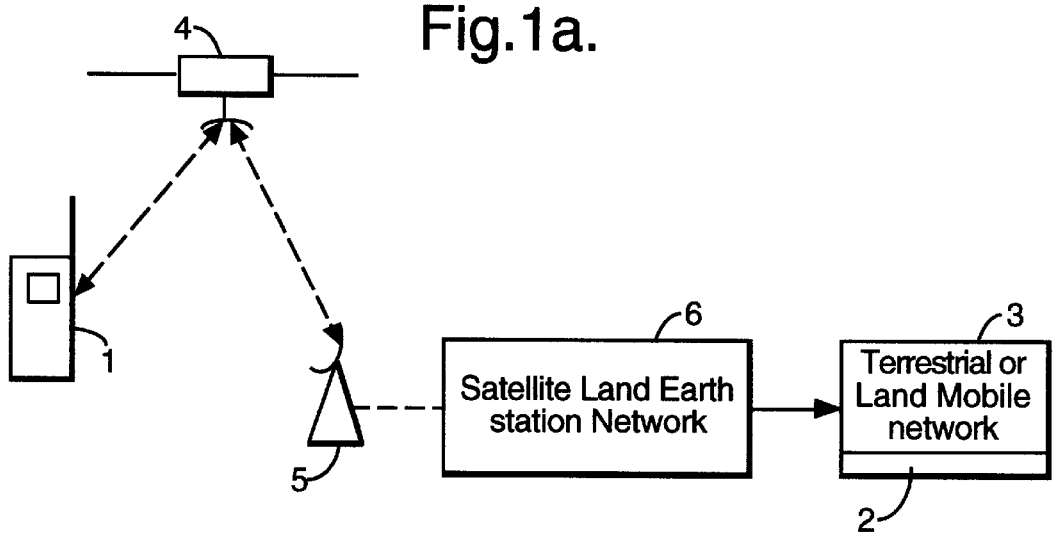

This invention relates to a method and apparatus for controlling time diversity in radio telephony.

BACKGROUND TO THE INVENTION

The invention has application, in particular, in personal satellite systems where power budgets are marginal, and also in terrestrial systems where signal levels can be at times insufficient, and in each system aims to improve the reliability of voice communication.

Satellite communications to hand-held terminals suffer from strong variations of the received signal power due to signal shadowing and multipath fading. Local shadowing of the satellite signal by obstacles in the propagation path, eg buildings, bridges, trees, results in attenuation over the total signal bandwidth. For low satellite elevation the shadowed areas are larger than for high elevation. Multipath fading occurs because the satellite signal is received not only via the direct path but also after being reflected from objects in the surroundings. Due to their different propagation distances, multipath signals can add destructively resulting in a deep fade. In addition to fade depth statistics, the distribution of fade duration has a major impact on the usability of the channel. Similar effects occur in both uplink and downlink directions although the statistics may vary, especially where the duplex distance in FDD transmissions is significantly large.

Therefore, for all types of land mobile satellite system, the communication link between the satellite and the mobile terminal is the most critical part of the total transmission path from earth-to-satellite-to-earth and limits the performance of the total system. Furthermore, hand-held systems are even more of a problem due to head effects and near-omni-directional antennas.

In most satellite radio environments applied to hand-held personal satellite services, high-frequency fading process is superimposed on the low-frequency shadowing process. Relatively "good" and very "bad" channel periods can be distinguished, having multiple dB mean level difference. The good channel state corresponds to areas with unobstructed view of the satellite (unshadowed areas) and is relatively free of multipath degradation. The bad channel state represents areas where the direct satellite signal is shadowed by obstacles and/or significantly affected by multipath fades.

In many existing systems two or more path diversity is used in order to improve system performance. The present invention is concerned with the variability of retransmission or redundancy of a single path.

Time diversity techniques also exist in known systems. One example of a known time diversity technique is applied in GSM, where the contents of a voice frame are spread over a number of TDMA slots by interleaving. The result is that the received signal may be reconstructed and the FEC information (forward error correction) that has been transmitted, together with the voice frame bits, is then used to correct any portions that may have been corrupted by multi-path fading or interference. The major disadvantage of such interleaving is that in order to successfully protect against serious levels of multi-path fading, deep interleaving must be used: ie, there is a substantial delay introduced in the voice communication. Long delays reduce the perceived quality due to the loss of interactivity in duplex conversations. Extreme examples of the effect of long delays are well known in multi-satellite paths used in some telecommunication circuits, although in this example the delay is set largely by the satellite path length rather than by deliberate interleaving and processing.

In another known time diversity technique, two (or more) representations of the speech signal are transmitted separated in time by an appropriate time dependent on the correlation characteristics of the radio path. In this example, the receiving equipment simply selects the least corrupted transmission on a slot-by-slot or frame-by-frame basis and reconstructs the audio path; the delay introduced in the audio path is constant and equal to at least the delay between the first and last samples.

More complex techniques may be added to either of the foregoing examples, or they may be combined in some way, and the transmission of secondary samples or associated FEC data may be suppressed if signalling indicates the first transmission is received successfully. The RACE ATDMA project employs such a technique based on ARQ Type II (Automatic Repeat Request). The advantage of selective transmission of secondary samples is that the demand on system/network resources (eg power and spectrum) is reduced.

It is also to be noted that the time-diverse components are normally transmitted to the receiver from the same transmitter, although the transmitter may employ "antenna diversity", and Qualcomm CDMA employs a technique similar to this for micro-cell operation. The use of a second transmitter and/or antenna site provides path diversity rather than direct time diversity. However, if the second transmission is only made when the first transmission is found to be corrupted (ie ARQ), then the present invention can be applicable.

SUMMARY OF THE INVENTION

According to one aspect of the present invention, there is provided a method of communication in radio telephony using time diversity in the transmitted signal, according to which the time diversity is varied in accordance with radio propagation conditions from relatively long time delays under poor propagation conditions down to relatively short delays or zero time delay under good propagation conditions.

According to another aspect of the invention, there is provided, in a system of communication in radio telephony, apparatus comprising means at a transmitting station for the introduction of time diversity, means for detecting the quality of signal received at a receiver station, and means at the transmitting station for varying the time delay of the diversity in accordance with the detected quality of communication at the receiver station.

Thus, the essence of the invention is to provide a technique where the time diversity may be varied according to the actual radio propagation conditions, ranging from nil diversity to time delays normally considered too extreme for duplex voice operation in public networks: eg up to several seconds.

In simple terms, the time diversity is freely variable during speech and the overall speech delay similarly varied such that under more favourable conditions the speech delay, and user perception of such delay, is considered minimal or undetectable (normally considered to be less than 40 ms). Under worse conditions, the delay is increased to allow diversity gain to be applied to maintain at least intelligible communication. The concept of increasing delay is not too difficult to consider, as it is only necessary to insert a period of silence for example. Provided the required increase is progressive, and can be done over a period of several seconds, then the user's perception and reaction need not be severe. The inserted delay thus needs to be carried out intelligently and, where possible, insertions made gradually by either inserting silence or preferably repeating selected frames at the end of words or at other less sensitive parts.

The concept of reducing delay when conditions improve is more radical, but it will be appreciated that it is possible to shorten a period of speech (of perhaps one or a few seconds) simply by omitting selected voice frames or selected voice patterns. Certain natural silence periods may also be omitted. Simple tests show that the loss of intelligibility by omitting selected portions of speech is minimal; the perceived loss of quality is largely unnoticed due to its transient nature, and this perception is preferable to complete loss of speech due to otherwise insufficient time delay diversity.

DESCRIPTION OF EMBODIMENTS

Figure 1B:
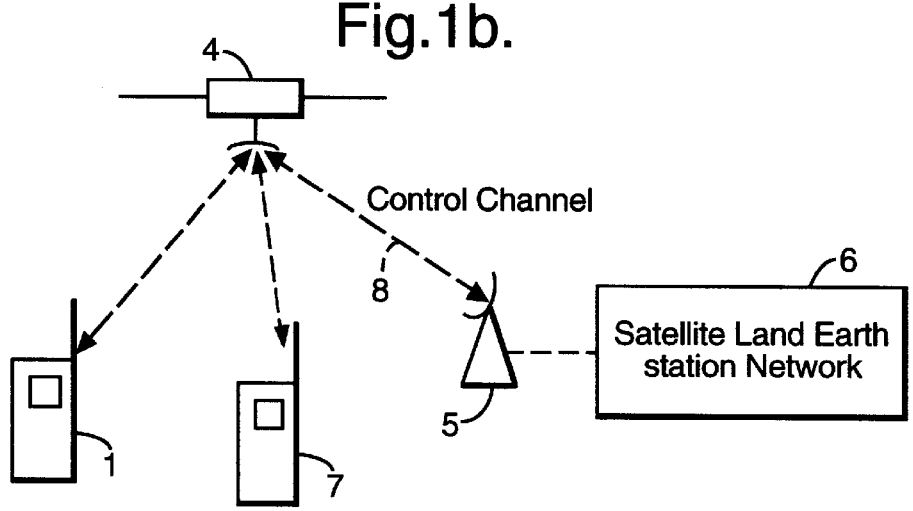
Figure 1C:
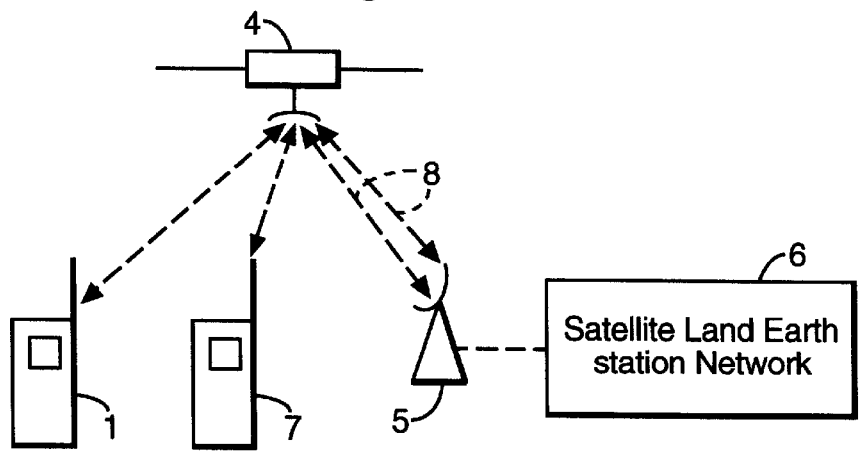
Figure 2:
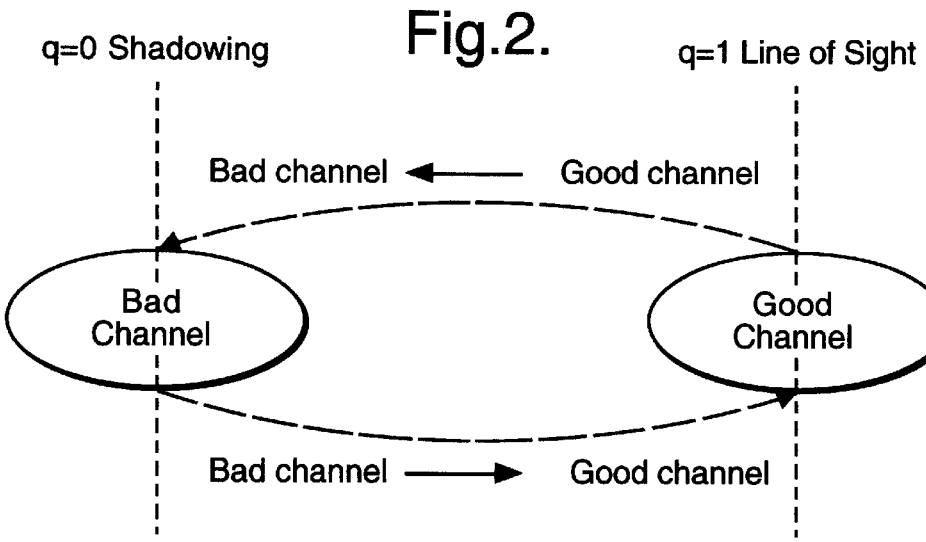
Figure 3:
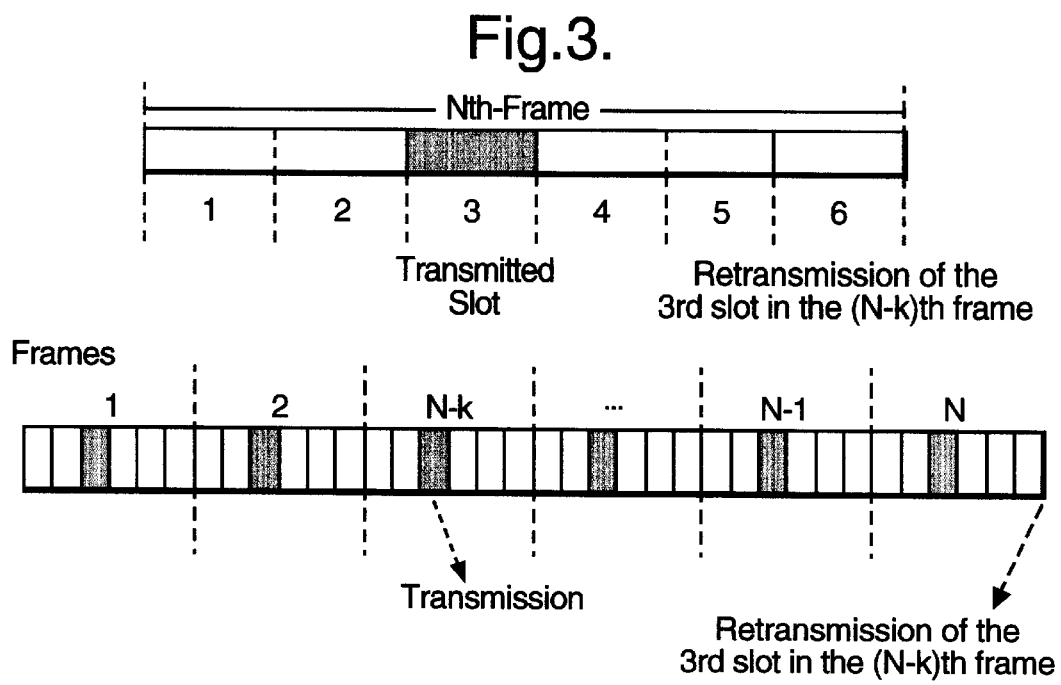
Figure 4:
Figure 5:
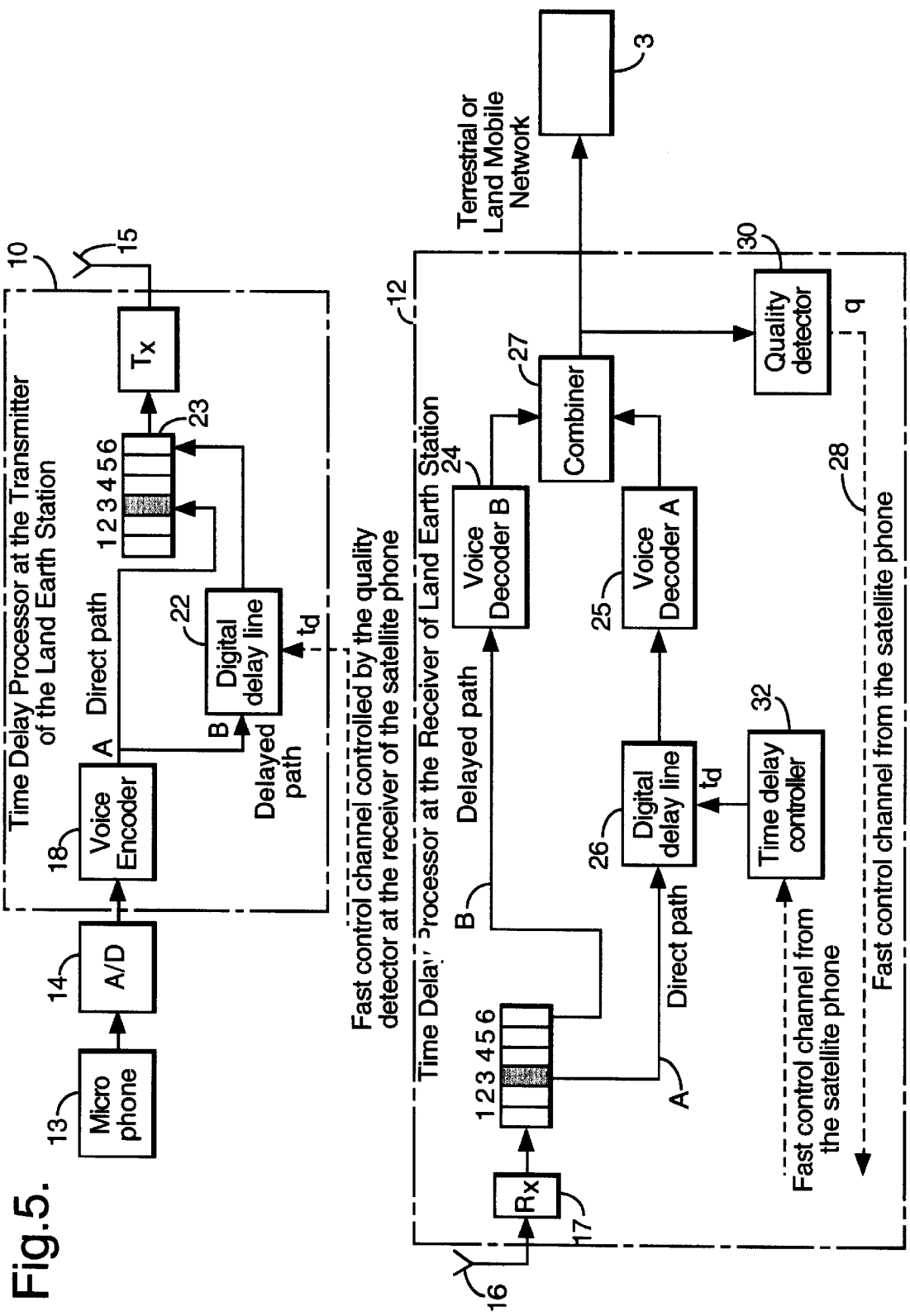
Figure 6:
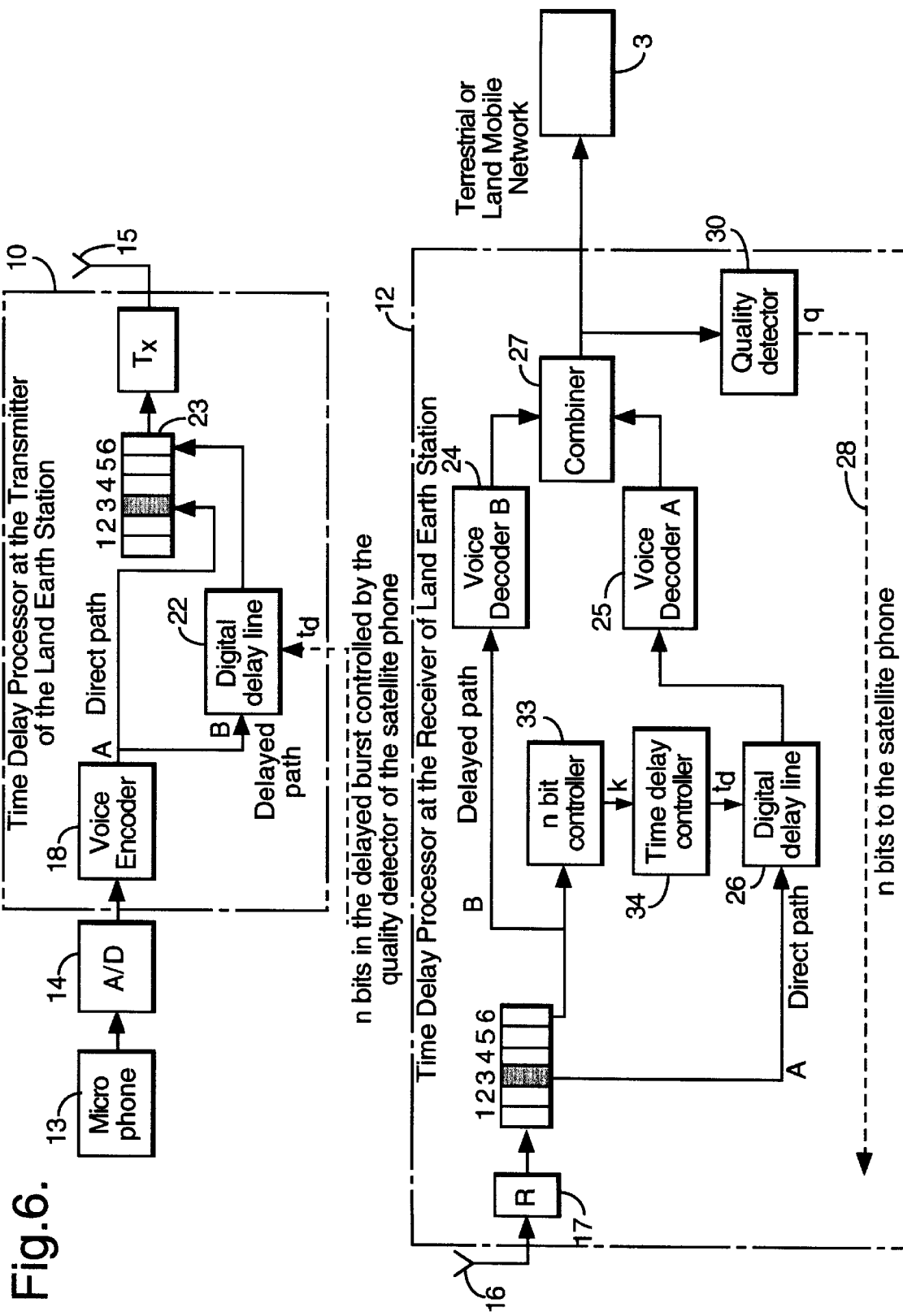
Figure 7:
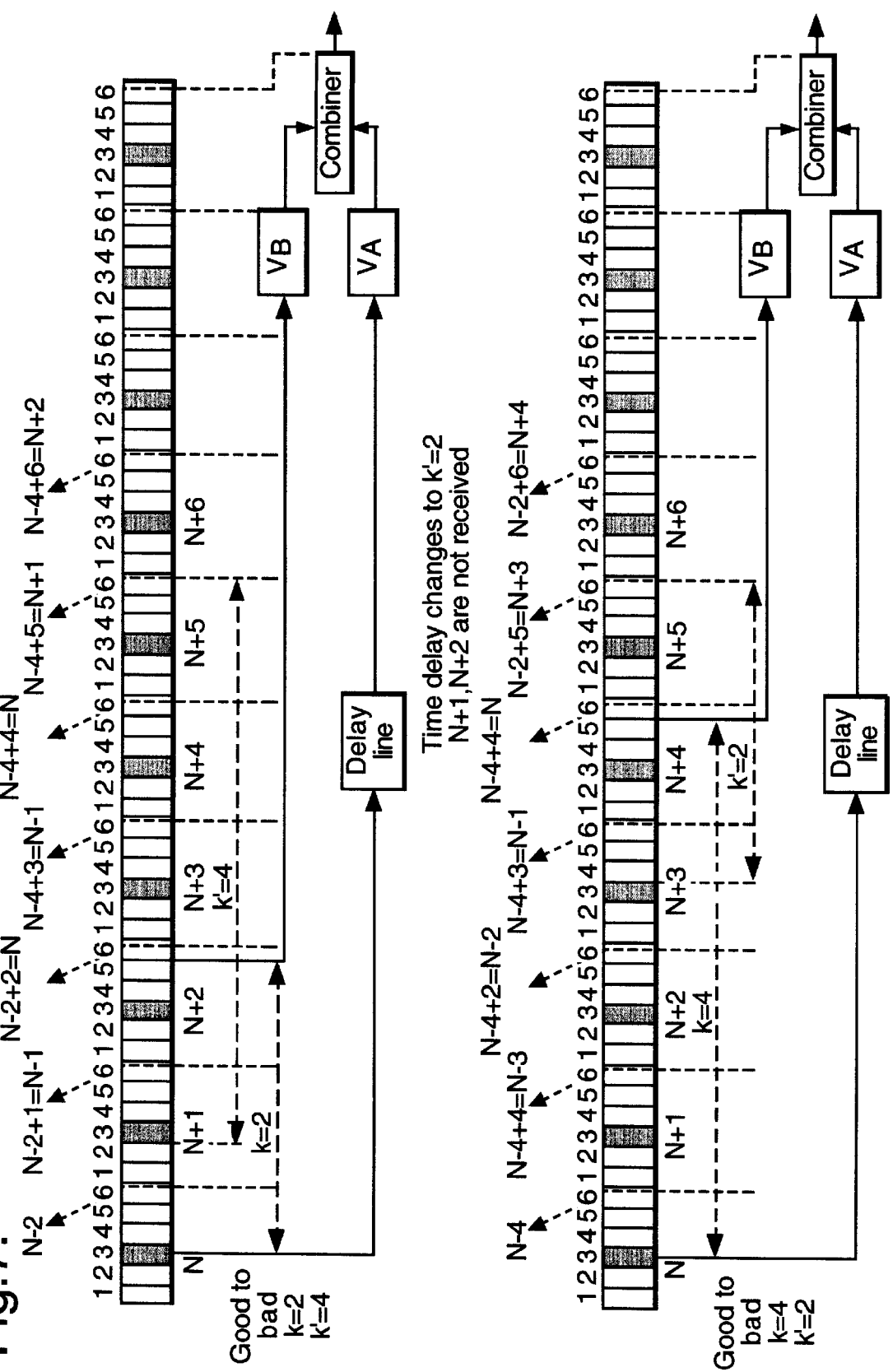

The invention will now be further described with reference to the accompanying drawings, in which:

FIG. 1 shows three possible forms of satellite link to which the present invention may be applied, FIG. 2 is a diagrammatic representation of a radio telephone channel of variable quality of communication, FIG. 3 is a diagram of transmitted frames in the communications channel, FIG. 4 is a diagram relating to time diversity introduced into a transmission channel, FIGS. 5 and 6 are block diagrams of two communication systems incorporating variable time diversity, and FIG. 7 illustrates examples of channel transitions.

The essence of the described arrangements is to employ time diversity techniques to mitigate against poor signal, that is the time diversity is adaptable according to the actual radio propagation conditions. The objective is to minimise the introduced delay, which can then range from low or nil diversity (under good conditions), to delays normally considered too extreme for duplex voice operation in public networks (eg up to several seconds) in order to maintain at least a basic communication facility. In many instances, the need to extend the delay to such high levels is only temporary and although it may still cause a minor problem to the users, it is by far less annoying than significant (even if only short) interruptions of the voice communication. The described system enhances the performance of a communication link between two telephones, where at least one is a satellite or dual mode (satellite and cellular) telephone.

FIG. 1 presents three possible network connections:

(a) Satellite telephone user 1 communicates with a user station 2 in a terrestrial or land mobile network 3 through a satellite 4, a terrestrial base station 5 and a land earth station 6. The user station 2 can be any wired or wireless telephone.

(b) Satellite telephone user 1 communicates with a satellite telephone user 7. The conversation is directly from one user station to another user station. The land earth station 6 controls the time delay updates between the two telephones, by means of a control channel indicated at 8.

(c) Satellite telephone user I communicates with a satellite telephone user 7. The conversation and control of the time delay updates between the telephones is established by the land earth station 6 through control channels 8.

The described system uses variable time diversity according to the actual radio propagation conditions. Generally, there is a high-frequency fading process superimposed on a low-frequency shadowing process. As a first approach to the proposed technique, it is proposed to use variable time diversity in order to tackle low-frequency fading process (bridges, lamp-posts, trees).

Only time domain diversity is considered in this description (ie no satellite diversity, no frequency diversity, no antenna diversity), although it may be combined with one or more of these.

The time delay (diversity) varies depending on measured channel quality and changes are performed in a controlled manner to minimise the perceptible audible effects.

Time delay diversity can be implemented in at least two different ways:

i) by using two separate channels, eg two slots in a TDMA transmission or two codes in CDMA. (Two separate FDMA channels could also be employed.)

ii) by adding powerful FEC to the data, and partitioning the data such that it is interleaved sufficiently to enable full recovery in the event of partial loss (eg up to 40%) of the error protected transmission (eg as GSM voice).

The first connection (FIG. 1(a)) is the most common communication link for a satellite telephone user. The main system explanation will be based on this communication link. Further explanation will be given for the other two communication links. Satellite telephone user 1 communicates with a user station 2 through the land earth station 6. The user station 2 can be any wired or wireless telephone. The Bit Error Rate (BER) performance enhancement device is part of the satellite telephone. At the other end, a similar device can be located at the satellite land earth station.

A user can occupy more than one time slot in a TDMA-format for transmission purposes. We will consider first a "bad" channel with a fixed delay, then the two transitions from "good to bad" and "bad to good" channel (FIG. 2). In a good channel, the delay can be reduced to low or zero values and, if desired, the second transmission entirely suppressed to avoid wasteful use of channel capacity.

For initial simplicity of explanation, it is assumed the transmission contained in the second (delayed) channel is a mere replica of the first channel. However, substantial further advantages are gained by making the second channel a coded variant of the first (eg such that the first and second can be decoded as a composite set using FEC principles).

FIG. 3 shows an example frame structure corresponding to a user terminal transmitting in TDMA format and occupying the third time slot in a frame of six time slots. Each time slot is 6.67 ms long. The entire frame is 40 ms long. It is proposed to employ retransmission time delays of at least the frame duration (40 ms) using a separate slot in a later frame, eg the sixth time slot in the N transmitted frame (as illustrated in FIG. 3) corresponds to the retransmission of the third time slot in the N-k frame.

The fade or channel characteristics are considered to be sensibly constant during any single slot. As a result, one or more slots can be received in deep fade or under good channel conditions. To tackle the problem of long fades the introduced time diversity is an integer multiple of the frame duration (plus or minus a time due to the slot positions, which are considered largely insignificant). In the following case, a retransmission delay of $t_d = kT_F$ (FIG. 4, $k=1,2 \ldots$, $k_{max}$ and $T_F$=frame duration) is considered. Faster changes due to short fades are in fact already compensated for by more conventional forward error coding without introducing any substantial delay.

Channel quality is characterised by a parameter q taking values in the interval [0, 1]. q=0 corresponds to worst case ("bad" channel), close to the communication link cut off point (typically corresponding to 4% BER cut-off for the speech decoder). Parameter q can be evaluated through RF measurements, evaluation of speech frames in error at the voice decoder or by other means that will be described.

If the measured quality q at the voice decoder at the receiver is greater than a variable threshold b there is no need for this slot retransmission after k frames, and k can be reduced. If, however, the channel quality degrades, it is necessary to increase the retransmission time delay by increasing k.

In FIG. 5, the rectangle 10 is a time delay processor incorporated in a transmitter of the land earth station 6, and the rectangle 12 is a time delay processor incorporated in a receiver of the land earth station 6. The processor 10 receives a signal from a microphone 13 and an analogue-to-digital converter 14, and delivers an output signal for transmission from an antenna 15. The processor 12 receives a signal from an antenna 16, and a receiver 17 and delivers a signal to the terrestrial or land mobile network 3.

Firstly, FIG. 5 will be described for the case where k is constant. The output from a voice encoder 18 in the processor 10 is fed to a direct path A and a delayed path B, with the path B being delayed by a shift register or similar delay element 22 in which the transmitted data is stored temporarily. The same block diagram as in FIG. 5 applies for the satellite mobile phone. The time delay is an integer number of frames $t_d = k\, T_F$ which is set by the satellite network and causes the retransmission of slot 3 in slot 6, as indicated pictorially at 23. The transmitted slot and its delayed version from the satellite mobile telephone are fed to two independent voice decoders 24, 25 in the processor 12 of the land earth station. However, before being input to the two voice decoders, the differential delay in the two signals is removed by adding delay as required; using a digital delay line or shift register 26, for example. The voice decoders 24, 25 are then operating in the same time regime and their outputs are combined in a combiner 27 in a way to minimise the number of corrupted or missing voice frames conveyed to the listener. The combiner 27 can be either a simple switch-like function, or it can be more closely integrated with the voice decoders to further enhance the receiver's performance by intelligent combining of the two decoded signals.

The description will be continued on the assumption of a fixed time delay $t_d$ to explain why an introduced time delay retransmission improves voice quality. In FIG. 5, consider the direct path A fed to voice decoder 25 and the delayed path B fed to voice decoder 24. P[A] is defined as the probability of speech frame error in the direct path A, P[B] the probability of speech frame error in the time delayed path B, and P[C] the probability of speech frame error at the output of the combiner. It is assumed that the system operates in a steady state "bad" channel, or "good" channel). In this simple case the combiner 27 is a switch. If the channel is "good" there is no need for signal retransmission so $$P[C]=P[A]$$

If path A is "bad" and the performance of the voice decoder 25 in path A deteriorates then the combiner 27 switches to the alternative path B which should exhibit an error rate performance of $$P[C]=P[B]$$

hoping that P[B]<P[A]. If the combiner 27 can select the better speech signal from both paths A and B and, if the errors in these two paths are totally uncorrelated, then there will be a clear benefit in such switched combining. It is known that if the same signal is transmitted in two uncorrelated radio channels, the two received signals will be subject to different errors. In an ideal case, the error probability of the combined signal at the output of the voice decoders (FIG. 5) is $$P[C]=P[A,B]=P[A]\times P[B]$$

In a Gaussian channel, this is equivalent to about 3 dB increase in the peak signal power.

Even in the less ideal case where full uncorrelated error processes are not present, the position of bits in error - inside the slots at the two paths at the input to the voice decoders - will tend to be random rather deterministic. There are therefore various possibilities of combinations to benefit from the second slot, over and above the simple fact that twice the signal information energy is available. In a simple implementation (ie simple switched combining at the voice decoder output) there is potentially an improvement equivalent to 3 dB extra peak carrier power. In more complex implementations (eg combining via optimal FEC coding gain techniques prior to the voice decoder(s), and even potentially optimal combining within the architecture of the voice decoder(s)), equivalent power gains of up to perhaps 8 dB are attainable. Optimal combining, coupled with FEC and static diversity techniques, is a known principle and is not the subject of this invention, but necessary for the full exploitation of the use of variable diversity.

By moving a step further on, FIG. 5 will now be described for the case of a variable time delay. The delay applied by the delay line 26 is variable in dependence upon a variable delay signal fed from a time delay controller 32. For the purposes of explaining how variable time delays are managed without significant user perception, the use of a simple switched combiner 27 is assumed. The delay is a variable integer number of frames $t_d=(k\times T_F)$ which is set by a quality detector 30 which supplies a fast control channel on a feedback path 28 to the time delay controller (corresponding to 32) in the satellite telephone and to a digital delay line (corresponding to 22) in the satellite telephone. Signals fed to the time delay controller 32 and the digital delay line 22 are derived from a quality detector (corresponding to 30) in the satellite telephone.

The time delay controller 32 varies the delay in the range $[0, k_{max} \times T_F]$ where $k_{max}\, T_F$, is the maximum introduced time delay value. The demodulated signal at the direct path A is fed to the variable digital delay line 26 which applies a delay $kT_F$, $k=0, \ldots, k_{max}$ and which is driven by the time delay controller 32 and then to voice decoder 25. The output of voice decoders 24 and 25 is fed to the combiner previously described.

The actual mechanism for communicating time delay updates $t_d$ between the receiver/transmitter of the land earth station and the transmitter/receiver of the satellite telephone need not be described in detail but is likely to be based on a programmed, system-clocked sequence with highly protected, low bit rate commands embedded in a fast control channel (FIG. 5) or normal voice channels (FIG. 6). In FIG. 6, components corresponding to those of FIG. 5 have been given the same reference numerals. The output on the feedback path 28 is fed to the digital delay line (corresponding to 22) in the satellite telephone, and the digital delay line 22 receives a signal from the quality detector (corresponding to 30) in the satellite telephone. The delay $t_d$ applied by the digital delay line is represented by the magnitude of the delay (n bits) which is controlled by the quality detector 30. In the processor 12, an n bit controller 33 derives the magnitude of k and governs a time delay controller 34 which derives the delay $t_d$ fed to the digital delay line 26.

It is a feature of the described system that when the signal is degrading (and the control channel becomes less secure), the actual mechanism increasing delay is inherently robust: the reverse mechanism (ie to remove delay) requires more secure control which is of course available in good radio conditions. For Frequency Division Duplex (FDD) transmission systems the delay value $t_d$ at the transmitter of the satellite telephone can be updated via a Fast Associated Control Channel (FIG. 6) controlled by the channel quality detector at a land earth station. Similarly, the introduced time delay in the transmitter of a land earth station is controlled by the channel quality detector at the receiver of a satellite telephone. For Time Division Duplex (TDD) transmission systems the time delay of the transmitter of a satellite telephone can be controlled by the channel quality detector located at its receiver. The same applies for the land earth station.

As the channel quality q (FIG. 2, q®0) degrades (transition from "good to bad" channel) the time delay $t_d$ increases in time steps equal to an integer number of frames: assume this to be $k \times T_F$ duration. On receipt of a time delay update at land earth station/satellite telephone, the previous speech slot is immediately repeated k times in the transmitter satellite telephone/land earth station delay line (alternatively some comfort noise can be introduced, possibly directly by the voice decoder on recognition of a "repeat" or "stretch" code). This results in this slot at the receiver of land earth station/satellite telephone being repeatedly fed to voice decoder 24. Voice decoder 24 operates using the updated value of time delay (new time regime), although the transient change may mean that the output of voice decoder 24 requires several voice frames to reproduce speech accurately, without significant artifacts. The information bits devoted for increase of time delay may be carried by a fast control channel (FIG. 5). Time delay updates are applied to digital delay line at path A as soon as the retransmitted slot (using the updated time delay) at path B is received by land earth station/satellite telephone. So both voice decoders operate in the same time regime. Alternatively, (as illustrated in FIG. 6) the information bits (eg n bits) devoted for increase of time delay may be carried within the slot itself in path B and when these bits are set, the time delay controller at the receiver can be increased by $k \times T_F$, notifying accordingly digital delay line at path A to increase its delay by repetition of a slot or comfort noise in a similar manner to the transmitter delay element of satellite telephone. However, the position of this "stretch" may be chosen: eg i) It can be added to the output of the delay element at the receiver of land earth station/satellite telephone. This means that the regime of voice decoder 25 is changed exactly at the same instant as voice decoder 24, and has the benefit of allowing the combiner to operate freely as before.

ii) It can be injected earlier in the digital delay element, or even at the beginning, or even on an adaptive basis to choose a non-critical portion of speech (eg silence). This means that the regime of voice decoder 25 is changed later (up to $k \times T_F$) than voice decoder 24.

During this period, the combiner cannot switch freely without causing aural artifacts, but a single switch from voice decoder 25 to 24 can be made at a convenient instant, eg during unvoiced phonemes.

If the delay is increased by a substantial number of frames, then i) may be preferable and is commensurate with a fast increase (100's ms), slow decrease (<100 ms) strategy in time delay control. The user will then hear a period of silence (or artificial interference, or even a replay of the last 100 ms) equal to the increase in delay: thus the user may not lose any speech at all, but merely sense a hesitation or interruption.

Here follows an example of "good" to "bad" channel transition. The upper part of FIG. 7 displays the effect of time delay increase at the receiver of a satellite telephone. Assume that the time delay has a value $t_d=kT_F(k=2)$ and changes to k=4. In this case, slot 3 of frames N−1 and N can be received again (a second re-transmission of N−1, N at land earth station, shadowed area in FIG. 7) or comfort noise can be put on path B, before voice decoder 24 starts operating in the updated time regime of k=4. Therefore, slot 3 of N+1 frame is re-transmitted with the updated time regime k'=4.

Transition from "bad to good" (ie a reduction in time delay) will only normally occur when both paths A and B - at the receiver of a satellite telephone - are exhibiting low error rates. Hence a strategy can be developed to systematically reduce the time delay in small steps until the desired new value of delay $t_d=k'T_F$ is attained. Reduction in time delay inevitably implies loss of speech information but it is a feature of this invention that the discarded portions of speech should be chosen to be of little value to the listener, for instance short silences or non-voiced sounds. In addition to normal reduction of time delays, some systems may be set to rapidly compress the delay when, for example, it is apparent that the speaker has paused, perhaps waiting a response from the listener.

During the transition from "bad to good" channel (FIG. 2, q®1) transmission time delay is reduced in path B. This results in one (or more) slots being lost at the receiver of a satellite telephone. Assuming these are lost at the output of the transmitting digital delay device (transmitter of a land earth station), then voice decoder 24 (at the receiver of a satellite telephone) will experience an abrupt change in regime, after which it may take a few frames to resume normal decoding. Hence the receiver combiner should be switched to voice decoder 25 until at least voice decoder 24 has returned to normal stable operation. The combiner may now be switched to voice decoder 24 (receiver at satellite telephone) which is operating in an earlier regime. This switching may be timed to occur during silence or a non-critical portion of speech. If the reduction is made in single steps, this timing is non-critical, but for larger step reductions in delay, careful timing is required. The receiver delay device at path A can now be reduced by the same number of frames and, after a short period, voice decoder 25 will restabilise and be operating in the same regime as voice decoder 24. Alternatively, the receiver delay device may be reduced by a larger number of frames, enabling the overall delay to be reduced further.

Here follows an example of "bad" to "good" channel transition. The lower part of FIG. 7 displays the effect of time delay increase at the receiver of a satellite telephone. Assume that the time delay has a value $t_d=kT_F(k=4)$ and changes to k=2. In this case, slot 3 of frames N+1, N+2 cannot be received (shadowed area in FIG. 7). Then the combiner has to rely on voice decoder 25. In this case, the channel quality improves (bad to good channel state transition) and the voice decoder 25 can deliver good speech signal to the telephone user.

During zero delay operation, path B is effectively redundant, and the transmission may be suppressed entirely. However if it is maintained, perhaps with a default delay of around 200 Ms, then the combiner and quality detector at the receiver always have the opportunity to recover from sudden degradations in path quality.

The preceding descriptions have assumed the use of two slots in a single TDMA transmission (and may equally be applied to separate codes in TDMA, or separate frequencies in FDMA). Another implementation (which requires the variable technique to be designed into the transmission scheme from the outset, rather than the addition to an existing defined system) could use a single (higher capacity) slot which is sub-divided with FEC protected bits being interleaved between subsequent slots. A form of this is already used in GSM. However the time variability can be introduced by varying the interleaving depth, and to incorporate regime management techniques during increases and decreases in interleaving depth.

What is claimed is:

1. A method of communication in radio telephony comprising the steps of:
   introducing time diversity in a transmitted signal, the transmitted signal comprising a first signal and a next signal, wherein the introduction of time diversity further comprises the steps of:
   varying a time difference between the first signal and the next signal in accordance with radio propagation conditions, wherein a relatively long delay is introduced under poor propagation conditions, and a relatively short delay or a zero delay is introduced under good propagation conditions.

2. A method according to claim 1, in which the time difference is varied in accordance with a variable depth of interleaving in the transmitted signal.

3. A method according to claim 1, in which the time difference is varied by incorporation in the transmitted signal of least two TDMA slots with time offset.

4. A method according to claim 1, using both variable depth interleaving according to claim 2 and time-offset TDMA slots in accordance with claim 3.

5. A method according to claim 1, wherein the communication is via an earth satellite.

6. The method of claim 1 further comprising the step of:
   introducing the time difference between the first signal and the second signal by incorporating at least two TDMA slots operating with time offset including a direct path signal from a vocoder to a frame sequence generator and a parallel delayed path signal from the vocoder to the generator through a delay line, the delay line adapted to introduce a delay of an integral number of frames, and wherein a time delay of the time diversity is varied in accordance with a detected quality of a combined signal received at the receiver station.

7. The method of claim 6 further comprising the steps of:
   receiving the direct path signal and the delayed path signal;
   introducing a time delay into the direct path signal wherein a first vocoder adapted to receive the direct path signal and a second vocoder adapted to receive the delayed path signal operate in a same time regime;
   selecting between or combining signals from the first vocoder and the second vocoder, wherein a signal from the first vocoder is initially used when a frame buffer in the transmitting station for providing the delayed path signal changes a delay in the delayed path signal, and then a signal from the second vocoder is used when a time delay controller changes the time delay in the direct path signal to bring both the first vocoder and the second vocoder in the same time regime.

8. In a system of communication in radio telephony, apparatus comprising means at a transmitting station for introduction of time diversity in a transmitted signal comprising a first signal and a next signal, means for detecting a quality of signal received at a receiver station, and means at the transmitting station for varying the time delay of a difference between the first and next signal in accordance with the detected quality of communication at the receiver station.

9. Apparatus according to claim 8, in which the means for introducing time diversity at the transmitting station comprises means for varying the depth of interleaving in the transmitted signal.

10. Apparatus according to claim 8, in which the means for introducing time diversity at the transmitting station comprises means for incorporation in the transmitted signal of at least two TDMA slots operating with time offset.

11. Apparatus according to claim 10, in which the means for introducing time diversity at the transmitting station comprises a direct path from a vocoder to a. frame sequence generator and a parallel path from said vocoder to said generator incorporating means for introducing a delay of an integral number of frames.

12. Apparatus according to claim 11, in which the receiver station includes two vocoders followed by a signal combiner, one vocoder for receiving the transmitted signal via a frame buffer and the other vocoder for receiving the transmitted signal via a delay line supervised by a time delay controller.

13. Apparatus according to claim 12, wherein the means for detecting the quality of signal received at the receiver station comprise a quality detector responsive to the output of the combiner.

14. An apparatus for a communication system in radio telephony comprising:
   means at a transmitting station for introducing time diversity between signals, the means comprising means for incorporating in a transmitted signal at least two TDMA slots operating with time offset including a direct path from a vocoder to a frame sequence generator and a parallel path from the vocoder to a generator incorporating means for introducing a delay of an integral number of frames;
   means for detecting the quality of signal received at a receiver station; and
   means at the transmitting station for varying a time delay of the time diversity in accordance with a detected quality of communication at the receiver station.

15. The apparatus of claim 14 wherein the receiver station includes two vocoders followed by a signal combiner, one vocoder for receiving the transmitted signal via a frame buffer and the other vocoder for receiving the transmitted signal via a delay line supervised by a time delay controller.

16. The apparatus of claim 14 wherein the receiver station includes two vocoders followed by a signal combiner and the means for detecting the quality of the signal received at the receiver station comprises a quality detector responsive to an output of the signal combiner.

17. The apparatus of claim 14 wherein the means for introducing time diversity at the transmitting station comprises means for varying a depth of interleaving in the transmitted signal including a direct path from a vocoder to a frame sequence generator and a parallel path from the vocoder to the generator incorporating means for introducing a delay of an integral number of frame, and the means for detecting the quality of the signal received at the receiver station comprises a quality detector responsive to the output of a signal combiner adapted to combine the transmitted signal via a frame buffer and the transmitted signal via a delay line supervised by a time delay controller.

18. The apparatus of claim 12 wherein the transmitted signal includes a direct path signal and a delayed path signal and the receiver station comprises:

a first voice decoder for receiving the direct path signal delayed by a time delay controller;

a second voice decoder for receiving the delayed path signal; and a signal combiner adapted to select between or combine the direct path signal and the delayed path signal, wherein the time delay controller is adapted to delay the direct path signal so that the first voice decoder and the second voice decoder operate in a same time regime, and wherein the combiner is adapted to initially utilize the first voice decoder when a frame buffer in the transmitting station for providing the delayed path signal changes a delay in the delayed path signal and then uses the second voice decoder when the time delay controller changes the time delay to the direct path signal to bring both the first voice decoder and the second voice decoder into a same time regime.

\* \* \* \* \*